US012554279B2

(12) United States Patent
Hermann

(10) Patent No.: US 12,554,279 B2
(45) Date of Patent: Feb. 17, 2026

(54) VOLTAGE REGULATOR CIRCUIT AND METHOD FOR PROVIDING A REGULATED VOLTAGE

(71) Applicant: Robert Bosch GmbH, Stuttgart (DE)

(72) Inventor: Carsten Hermann, Dusslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 213 days.

(21) Appl. No.: 18/547,405

(22) PCT Filed: Feb. 8, 2022

(86) PCT No.: PCT/EP2022/052926
§ 371 (c)(1),
(2) Date: Aug. 22, 2023

(87) PCT Pub. No.: WO2022/184384
PCT Pub. Date: Sep. 9, 2022

(65) Prior Publication Data
US 2024/0143010 A1 May 2, 2024

(30) Foreign Application Priority Data
Mar. 5, 2021 (DE) .................... 10 2021 202 149.2

(51) Int. Cl.
*G05F 1/575* (2006.01)
*G05F 1/46* (2006.01)

(52) U.S. Cl.
CPC ............ *G05F 1/575* (2013.01); *G05F 1/468* (2013.01)

(58) Field of Classification Search
CPC . G05F 1/575; G05F 1/56; G05F 1/573; G05F 1/565; G05F 1/561; G05F 1/569; G05F 1/46; G05F 1/468; G05F 1/461
See application file for complete search history.

(56) References Cited

U.S. PATENT DOCUMENTS

| 4,970,415 A * | 11/1990 | Fitzpatrick | G05F 3/245 323/907 |
| 6,608,520 B1 * | 8/2003 | Miyazaki | G05F 1/575 327/540 |

(Continued)

FOREIGN PATENT DOCUMENTS

JP 2005165379 A 6/2005

OTHER PUBLICATIONS

International Search Report for PCT/EP2022/052926, Issued Jun. 7, 2022.

(Continued)

*Primary Examiner* — Bryan R Perez
(74) *Attorney, Agent, or Firm* — NORTON ROSE FULBRIGHT US LLP

(57) ABSTRACT

A voltage regulator circuit for providing a regulated voltage. The voltage regulator circuit includes: a regulator core which includes an operational amplifier having an output, a first input, and a second and third input configured to have the opposite polarity to the first input; and an output stage including a transistor, wherein the output is electrically conductively connected to the control terminal of the transistor, the first input is electrically conductively connected to a second terminal of the switching path of the transistor, and the third input can be electrically conductively connected to a reference voltage source. The second input can be electrically conductively connected to an input voltage source and the second input is electrically conductively connected to the output of a module which is configured to impress a control current into the second input, the level and/or polarization of which is dependent on a predetermined parameter.

10 Claims, 6 Drawing Sheets

(56) References Cited

U.S. PATENT DOCUMENTS

| | | | |
|---|---|---|---|
| 7,253,589 B1 | 8/2007 | Potanin et al. | |
| 2011/0309808 A1* | 12/2011 | Zanchi | G05F 1/575 323/282 |
| 2012/0098513 A1 | 4/2012 | Terada et al. | |

OTHER PUBLICATIONS

Texas Instrument, "TPS74701 500-MA Low-Dropout Linear Regulator With Programmable Soft-Start," 2015, pp. 1-31.

* cited by examiner

VOLTAGE REGULATOR CIRCUIT AND METHOD FOR PROVIDING A REGULATED VOLTAGE

FIELD

The present invention relates to a voltage regulator circuit and to a method for providing a regulated voltage.

BACKGROUND INFORMATION

In many different applications, a regulated voltage is required as an output voltage or operating voltage of a circuit. Fluctuations in the input voltage, which can be provided by, inter alia, a battery or a power grid, can be compensated for in this way. In particular, electronic circuits require a constant electrical operating voltage which is both independent of the input voltage and also stable, i.e., is independent of the current consumed by electrically connected loads. One application of this kind may be in an application-specific integrated circuit (ASIC), which is an electronic circuit implemented as an integrated circuit.

In cases such as these, voltage regulators are used. They usually have a structure characterized by a regulator core and an output stage electrically conductively connected to the output of the regulator core. Their mode of functioning is that the regulator core compares an output voltage actually provided by the output stage with a desired output voltage, and a suitable difference between the input voltage and the output voltage actually provided is eliminated by way of a controllable resistor. This function is implemented by a transistor. In terms of control, the transistor of the output stage is the final control element. If the output voltage actually provided is lower, for example, its actual value (controlled variable) is also lower. The difference between the target value of the desired output voltage (reference variable) and the actual value increases, causing an increase in the deviation (or error). The manipulated variable is made greater by an amplifier, the so-called regulator, which is called the regulator core here. The control voltage provided by the regulator core also turns on the transistor and, as a result, the output voltage actually provided is thus readjusted again until the deviation decreases and approaches zero.

A special case exists where the provided output voltage to be regulated by the voltage regulator differs from the available input voltage only to a minor extent or is only slightly below this input voltage. In this case, a voltage regulator comprising a P-channel output stage can be used, inter alia. Here, the source-gate voltage of a PMOS output stage or the base-emitter voltage of an output stage comprising a PNP bipolar transistor can, for example, be actuated by the regulator core such that the source-drain voltage of the PMOS transistor or the collector-emitter voltage of the PNP transistor is only a few hundred millivolts. Particularly for battery-operated devices or controllers, as used, inter alia, in vehicles, in this way the provided output voltage can thus be maintained for a long period of time even when the input voltage is dropping. For example, this effect can occur when a battery is providing an input voltage but its voltage has dropped, for example when a vehicle has not been used for a long time.

The regulator core of the voltage regulator provides a control voltage for actuating a transistor output stage, which is dependent both on the load current that the transistor output stage needs to provide and on the difference between the input voltage and the desired output voltage. A higher load current also requires a higher control voltage in order to reach or maintain the target value of the output voltage. In the same way, a smaller difference between the input voltage and the desired output voltage requires a higher control voltage. In this case, it should be noted that the control voltage is additionally dependent on different influencing variables such as, inter alia, temperature and batch variations, which occur while the semiconductor is being produced.

Furthermore, the control voltage must not exceed either the maximum permissible source-gate voltage (in the case of a PMOS output stage) or the maximum permissible base-emitter voltage (in the case of an output stage comprising a PNP bipolar transistor). On the other hand, when the load current is too high or when the difference between the input voltage and the desired output voltage is too small, an increase in the control voltage beyond a certain value of the control voltage no longer results in the output voltage being increased or maintained.

A special situation arises in the event of a drop. A drop occurs when the input voltage of the regulator falls below a certain value at which the desired output voltage can no longer be reached or maintained. The target value is not reached irrespective of how high the control voltage for actuating a transistor output stage is set by the regulator core, which detects a constant deviation. Nevertheless, the control voltage is continually increased by the regulator core. If the input voltage rises spontaneously and suddenly with a steep gradient $\partial u/\partial t$ during this process, the control voltage for actuating a transistor output stage is adjusted and reduced by the regulator core in a delayed manner. The slew rate of the regulator core is characteristic of this. The slew rate denotes the rate of rise, the edge steepness, or the maximum rate of rise or drop of the output voltage of an amplifier circuit or driver circuit, specifically an operational amplifier. If the rise speed of the input voltage exceeds the slew rate of the regulator core at which it adjusts the control voltage for actuating a transistor output stage, this can lead to an undesired, and in some circumstances very substantial, overshoot of the output voltage. This behavior can also be brought about by a dead time arising in which an adjustment to the control voltage has not yet caused a reaction by the transistor output stage.

The related art describes voltage regulators comprising transistor output stages in which the regulator core has two negative inputs, the first of which is connected to a reference voltage, which acts as a reference variable when behavior is normal and there is a sufficiently high input voltage. The second negative input of the regulator core is electrically conductively connected to the input voltage by a voltage divider. The regulator core is configured such that the lower of the two voltages dominates at the two negative inputs and is used to establish the difference from the positive input. In this case, the voltage divider is dimensioned such that the divided input voltage provided at the second negative input starts to dominate, or in other words is lower than the reference voltage, as soon as the difference between the input voltage and the target value of the output voltage reaches or falls below a critical value, i.e., in particular when the input voltage falls below a certain value beyond which the original target value of the output voltage can no longer be guaranteed. Consequently, instead of the previously used reference variable in the form of the reference voltage, the divided input voltage at the second negative input now functions as the reference variable. In this way, the voltage regulator provides a new desired output voltage that is lower than the originally desired output voltage. It is also lower than the input voltage. By way of this measure, the situation described at the outset in which the voltage regulator undergoes a drop can be avoided. As a result, there is also no excessively high manipulated variable which could result in an overshoot of the output voltage if the input voltage suddenly rises. For this solution to have the desired effect, it is crucial to give the voltage divider, via which part of the input voltage is supplied to the regulator core, suitable dimensions.

A voltage regulator of this kind is shown in FIG. 1.

In the simplest case, the regulator core 2 consists of a differential amplifier or operational amplifier.

FIG. 2 shows such a differential amplifier, comprising a non-inverting input INP and two inverting inputs INN1 and INN2, as well as a positive output OUTP.

In FIG. 1, the positive input INP 23 of the regulator core 2 is electrically connected to the output (network VISI) of the voltage divider composed of R1 and R2. This voltage divider controls the divided output voltage (network VISI). A first inverting input INN1 24 of the regulator core 2 is electrically connected to the output (network VLIM) of the voltage divider composed of R3 and R5, which controls the divided input voltage UVIN at its output (network VLIM), and a second inverting input INN2 25 is electrically connected to a reference voltage UVREF, which has to be provided via the input VREF in FIG. 1. CLAST is the load capacity of the voltage regulator. To solve the problem described at the outset in the event of a drop, the voltage divider composed of R3 and R5 is dimensioned such that the voltage UINN1 at the input INN1 24 of the regulator core 2 is lower than the reference voltage UVREF at the input INN2 25 of the regulator core 2 when the difference between the input voltage and the target value of the output voltage reaches or falls below a critical value beyond which the voltage regulator could no longer reach or maintain the nominal target value of the output voltage UVOUT_nom. In this situation, the voltage at the first negative input INN1 24 is lower than the voltage at the second negative input INN2 25. In this case, the first negative input INN1 24 dominates the second negative input INN2 25 and the output voltage UVLIM of the voltage divider composed of R3 and R5 is then used as the reference variable for the regulator core 2 instead of the reference voltage UVREF. Therefore, the voltage regulator will provide a reduced, regulated output voltage UVOUT_red at its output VOUT. This output voltage is both lower than the original nominal target value of the output voltage UVOUT_nom and lower than the input voltage UVIN.

The differential input voltage of the regulator core 2 that is processed thereby is calculated as follows:

$$\Delta U = UINP - \min(UINN1, UINN2) \quad (1)$$

The nominal output voltage provided by the voltage regulator is:

$$UVOUT\_nom = UVREF \times (R1+R2)/R2. \quad (2)$$

The voltage at the first negative input 24 of the regulator core 2 is:

$$UVLIM = UVIN \times R5/(R3+R5). \quad (3)$$

In the event that the voltage UVLIM is lower than the reference voltage UVREF, the provided output voltage is then reduced to:

$$UVOUR\_red = UVLIM \times (R1+R2)/R2. \quad (4)$$

By switching the reference variable to the divided input voltage and by giving the voltage divider used for this purpose suitable dimensions, the voltage regulator is prevented from encountering a drop. In addition, this therefore avoids a situation in which the output voltage overshoots owing to an excessively high control voltage at the transistor output stage since the input voltage has risen spontaneously and with a steep gradient during the drop.

However, it should be noted here that, in addition to a variable input voltage, various other parameters influence the voltage regulator. These parameters include, inter alia, the temperature that prevails in the vicinity of the voltage regulator and thus also influences the temperature of its components. Furthermore, the process of producing a transistor comprises a plurality of steps. Any process has certain manufacturing tolerances, which ultimately have an impact on the characteristic curve of the transistor. These are referred to as manufacturing variations or batch variations/the batch condition. They likewise constitute a parameter which influences the voltage regulator. Lastly, the load current, which differs depending on the application, is also one such parameter. These circumstances have an impact on the dimensions of the voltage divider, which provides the reduced input voltage in the form of a new reference variable at the second negative input of the regulator core. On the basis of these parameters, the voltage divider has to be defined such as to take the most unfavorable situation as a basis in each case. In other words, it has to be dimensioned such that, in the event of a maximum permissible load current, an unfavorable manufacturing-related batch condition of the semiconductor acting as the output stage, and an operating temperature that is unfavorable for the output stage, the input voltage is divided such that the voltage regulator does not undergo a drop. However, this has the consequence that, under favorable circumstances, the voltage divider divides the input voltage such that it dominates over the reference voltage at the first positive input and acts as a new reference variable, even though, technically speaking, this is not necessary.

SUMMARY

According to the present invention, a voltage regulator circuit for providing a regulated voltage is provided. According to an example embodiment of the present invention, the voltage regulator circuit comprises a regulator core, which comprises an operational amplifier having an output, a first input, and a second and third input, the second and third input being configured to have the opposite polarity to the first input. The voltage regulator circuit further comprises an output stage comprising a transistor, wherein the output is electrically conductively connected to the control terminal of the transistor, wherein the first input is electrically conductively connected to a second terminal of the switching path of the transistor, and wherein the third input can be electrically conductively connected to a reference voltage source. In this case, the second input can be electrically conductively connected to an input voltage source and the second input is electrically conductively connected to the output of a module which is configured to impress a control current into the second input, the level and/or polarization of which is dependent on a predetermined parameter.

The present invention has the advantage that the voltage regulator circuit having parameter-dependent drop regulation at a low input voltage has increased availability compared with a voltage regulator having conventional drop regulation. While, in the conventional approach, the reduced output voltage UVOUT_red needs to be configured for the most unfavorable situation arising, for example, in the event of a maximum permissible load current, an unfavorable manufacturing-related batch condition of the semiconductor, and/or an operating temperature that is unfavorable for the output stage, in the principle proposed here parameters such as the current temperature, the actual or current load current, and the batch condition can be taken into account. A voltage regulator circuit having a P-channel output stage can be used, inter alia, in a controller for a vehicle. While the vehicle is not in use, the controllers installed in the vehicle are generally in a standby mode, in which they only consume a very small amount of current (usually in the pA range). Accordingly, the load current of a voltage regulator circuit that has a P-channel output stage and is installed in a controller is also very low. The current temperature also only rarely corresponds to the operating temperature that is unfavorable for the P-channel output stage. At its maximum permissible operating temperature limit (for example 150° C. or 175° C.), a P-channel output stage can, for example, supply a much lower load current than may be the case at temperatures in a vehicle that is not in use. In this respect, the present invention makes it possible to provide the output voltage of a voltage regulator circuit having a P-channel output stage even at a very low input voltage in standby mode. For example, this makes it possible, when switching from the standby mode to normal operation in the known procedure, to first activate a voltage booster, which ensures a sufficiently high input voltage of the voltage regulator before its consumers are switched on in normal operation and the current consumption can rise sharply (usually in the mA or amp range).

According to an example embodiment of the present invention, the transistors used can in particular be MOS transistors; however, this principle is also applicable to JFET transistors or bipolar transistors. P-channel transistors and N-channel transistors can also be used, in particular PMOS transistors or also NMOS transistors. The term "switching path" used in the following relates to the lines and connections that lead from the drain terminal and from the source terminal in the case of MOS transistors and lead from the collector terminal and from the emitter terminal in the case of bipolar transistors. The terms "first terminal" and "second terminal" that are also used in this context relate, depending on the type of transistor, either to the source terminal (first terminal) and the drain terminal (second terminal) of an MOS transistor or to the collector terminal and emitter terminal of a bipolar transistor.

According to an example embodiment of the present invention, the operational amplifier of the regulator core can comprise either two non-inverting inputs and one inverting input or one non-inverting input and two inverting inputs. This depends on the number of stages of the operational amplifier and on the selection of the function, for example. In the following exemplary embodiment, an operational amplifier comprising two non-inverting inputs and one inverting input is used, but the present invention is not limited to this arrangement. In any case, the circuit of the operational amplifier is structured in respect of the unipolar inputs such that two transistors arranged in series are each electrically conductively connected to one input by their control terminals and one of the two transistors limits the current flow or, in other words, determines and therefore dominates the maximum current flow.

In a preferred embodiment of the present invention, the output stage is configured as a P-channel output stage. This may be a PMOS output stage or an output stage comprising a PNP bipolar transistor. When using an N-channel output stage, the control voltage applied at the gate terminal or the base terminal would have to be higher than the input voltage applied at the drain terminal or the collector terminal. Furthermore, the control voltage would also have to be higher than the output voltage that is provided by the regulator and is applied at the source terminal or emitter terminal. Both conditions are required for it to be possible to activate the N-channel output stage. In principle, this would require a voltage which would be higher than the input voltage to be present in the system. In many applications, there is no such high voltage in the system, or it would alternatively need to be generated by an additional charge pump, for example. By contrast, a P-channel output stage has the advantage that, at its gate terminal or base terminal, it only requires a control voltage that is below the input voltage applied at the source terminal or emitter terminal of the P-channel output stage.

According to an example embodiment of the present invention, advantageously, the output of the regulator core is not directly electrically conductively connected to the output stage, but instead is first connected to an intermediate stage, which comprises an N-channel transistor and a current mirror. The source terminal of the N-channel transistor is electrically conductively connected in series with a resistor and ground. The drain terminal is connected to the drain terminal of a mirror transistor of the intermediate stage, the source terminal of which mirror transistor is in turn electrically conductively connected to an input voltage source, just like the source terminal of the output stage. Furthermore, the drain terminal of the N-channel transistor is short-circuited both with the gate terminal of the mirror transistor and with the control terminal of the transistor of the output stage. The advantage becomes apparent particularly when using a P-channel output stage, since there is a quadratic relationship between the source-gate voltage and the drain current of the P-channel transistor, and thus even a minor change in the source-gate voltage brings about a significant change in the drain current. Owing to the serial resistor, the N-channel transistor exhibits a relationship that is linear in a first approximation, and therefore, in conjunction with the current mirror, the inherent amplification of the output stage is no longer necessarily a determining factor. The width-length ratio of the first mirror transistor and of the transistor of the output stage is selected on the basis of the application and the required current intensity.

Preferably, according to an example embodiment of the present invention, the first input of the regulator core, in the form of a negative-feedback input, is electrically conductively connected to a second terminal of the switching path of the transistor of the output stage, the connection being established at the tap of a first voltage divider, which comprises a first and a second resistor to be dimensioned suitably. Therefore, the output voltage is divided by the first voltage divider and subsequently only a fraction of the output voltage is fed to the first input.

In a further advantageous embodiment of the present invention, the output stage comprises a cascode transistor, in which case the transistor of the output stage is preferably a low-voltage transistor, the cascode transistor is a high-voltage transistor, and the transistor of the output stage is electrically connected in series with the cascode transistor at its second terminal. This is recommended in particular if higher output voltages, particularly in the range of 40 volts, are required. The transistors arranged upstream of the cascode transistor can then be low-voltage transistors, which ensure the desired rapidity and accuracy and are protected by the cascode transistor.

According to an example embodiment of the present invention, preferably, the voltage regulator circuit comprises a second voltage divider, which can be connected to an input voltage source at the input side, and the second input can be electrically conductively connected at the output of said voltage divider.

In another advantageous embodiment of the present invention, the second voltage divider comprises a first, second, and third resistor, such that a first and a second tap is present at a first and a second node within the arrangement of the first, second, and third resistor. The second input of the regulator core is electrically conductively connected to the output of a module which is configured to impress a control current into the second input, the level and/or polarization of which is dependent on at least one predetermined parameter and/or at least one measured variable. The second input of the regulator core can be electrically conductively connected to the first tap of the second voltage divider via the first node. The module can be electrically conductively connected to the second tap of the second voltage divider via the second node. This preferred specific embodiment is not limited to this arrangement. Alternatively, the second input of the regulator core can be electrically conductively connected to the second tap of the second voltage divider via the second node and the module can be electrically conductively connected to the first tap of the second voltage divider via the first node. In a further alternative embodiment, a third resistor for the second voltage divider can be omitted, such that the first inverting input and the module are electrically interconnected via the same tap via the same node.

Since the module can impress a control current into the second input, the level and/or polarization of which is dependent on a predetermined parameter and/or a measured variable, the voltage at the second input of the regulator core can be influenced such that it assumes a higher or lower value than would be the case without the control current or with a control current of 0 amps, which would correspond to the conventional voltage regulator. Therefore, the voltage regulator circuit according to the present invention can vary the voltage at the second input despite the constant input voltage. Owing to the polarization of the control current, the voltage at the second input can be both increased and decreased compared with the case in which this voltage is determined by a constant second voltage divider. Since the lower of the two voltages dominates at the second and third input, the voltage that can be influenced by the module at the second input is used to establish the difference at the input of the regulator core instead of the reference voltage, when the criteria for doing so are fulfilled.

According to an example embodiment of the present invention, the level and/or polarization of the impressed control current is determined on the basis of predetermined parameters. Therefore, it is possible to adjust the fraction of the input voltage originally determined by way of a second voltage divider to other situations, as a result of which the target value of the output voltage can in particular only drop to the extent that the output stage is still capable of reaching this output voltage without the voltage regulator circuit undergoing a drop. The control current is provided by the module on the basis of an analog function, this function obtaining different predetermined parameters as input variables and generating a control current on that basis.

A first parameter is preferably determined by the load current provided by the output stage. This varies depending on the application, and so the load current actually drawn can differ substantially from the highest load current that is possible in theory. Accordingly, the voltage divider, which otherwise has fixed dimensions, and the value of the input voltage divided thereby do not have to be dimensioned for the highest possible load current, since, by taking this into account and owing to the control current that is dependent thereon, the actually predominant relationships are taken into account.

A second parameter is preferably determined by the batch condition of the output stage. Consequently, the voltage divider, which otherwise has fixed dimensions, and the value of the input voltage divided thereby need not necessarily be configured for an unfavorable manufacturing-related situation in which a poor-quality semiconductor is used as a transistor of the output stage. Here too, it is possible to adjust the actual relationships by way of a control current that is dependent on the batch condition.

A third parameter is preferably determined by the temperature prevailing in the immediate vicinity of the voltage regulator circuit. This has a considerable influence on the functioning of the transistor of the output stage. This situation can also be taken into account by impressing a temperature-dependent control current.

According to an advantageous embodiment of the present invention, the module comprises a first coupling circuit, which has a transistor and a resistor, wherein the control terminal of the transistor is electrically conductively connected to the output of the regulator core, and wherein the switching path of the transistor is electrically conductively connected to the second input of the regulator core at a second terminal and is electrically conductively connected to ground by a first terminal via a resistor arranged in series.

The detailed circuitry implementation of the aforementioned advantageous embodiment of the present invention, as described in the following, is used to determine and provide the control current on the basis of the load current. It should be noted that this is a possible proposed preferred specific embodiment. The output of the regulator core is electrically conductively connected to the control terminal of a transistor of the first coupling circuit in parallel with the output stage via an optional RC low-pass filter. If the load current of the voltage regulator circuit changes, the regulator core has to adjust the control voltage, as a result of which the same adjusted voltage is also present at the control terminal of the transistor of the coupling circuit. The current on the switching path of the transistor is therefore proportional to the load current of the voltage regulator circuit and thus contains the information on the load current.

According to an example embodiment of the present invention, the switching path of the transistor of the coupling circuit, which path is opposite the grounded part of the switching path, is electrically connected to the second input of the regulator core, and particularly preferably to a third current mirror, which comprises a first and a second transistor. This third current mirror in turn is electrically connected to a fourth current mirror, which likewise comprises a first and second transistor. When the output of the fourth current mirror is connected to a line which in turn is electrically connected to the second input of the regulator core, the load current therefore influences the voltage regulator circuit. As a result, the voltage at the second input of the regulator core can be influenced on the basis of the load current of the voltage regulator circuit such that, if the difference between the input voltage and the target value of the output voltage of the voltage regulator circuit is too small, the output voltage is lowered according to the load current that is currently to be provided only to the extent that the output stage is still capable of reaching or maintaining this new lowered or reduced target value of the output voltage without the voltage regulator undergoing a drop in the process.

In another preferred embodiment of the present invention, the module comprises a second coupling circuit, which has a first, second, third, and fourth current mirror, a transistor, and a first, second, and third resistor, wherein the control terminal of the transistor is electrically conductively connected to the control terminals of the first current mirror. Furthermore, the switching path of the transistor is electrically conductively connected to the second input of the regulator core at a first terminal and is electrically conductively connected to ground by a second terminal via a first resistor arranged in series. The switching path of the first mirror transistor of the first current mirror is electrically conductively connected to the second input of the regulator core at a first terminal and is electrically conductively connected in series with a second terminal of the first mirror transistor of the second current mirror by a second terminal. In addition, the switching path of the first mirror transistor of the second current mirror is electrically conductively connected to ground at a first terminal via a second resistor arranged in series and the switching path of the second mirror transistor of the second current mirror is electrically conductively connected by a first terminal to the switching path of the transistor of the first coupling circuit between the transistor of the first coupling circuit and the resistor of the first coupling circuit, wherein a third resistor is arranged between the connection and the transistor of the first coupling circuit. The switching path of the second mirror transistor of the first current mirror and the switching path of the second mirror transistor of the second current mirror are electrically conductively connected to the second input at a first and a second terminal. The switching path of the second mirror transistor of the first current mirror is electrically conductively connected to the switching path, opposite ground, of the transistor of the first coupling circuit by a second terminal. The switching paths of the first and second mirror transistor of the third current mirror are electrically conductively connected to the first input of the regulator core at a first terminal and the switching path of the first mirror transistor of the third current mirror is electrically conductively connected to the switching path, opposite ground, of the transistor of the first coupling circuit by a second terminal. Furthermore, a constant current source is electrically conductively connected to the switching path between the first mirror transistor of the first current mirror and the first mirror transistor of the second current mirror. The switching path of the first mirror transistor of the fourth current mirror is electrically conductively connected to the second mirror transistor of the third current mirror at a second terminal and is electrically conductively connected to ground by a first terminal. In addition, the switching path of the second mirror transistor of the fourth current mirror is electrically conductively connected to the second input at a second terminal and is electrically conductively connected to ground by a first terminal.

This above-described circuitry implementation is used to determine and provide the control current on the basis of the batch condition and the load current. In other words, it constitutes the circuitry implementation of the module and its analog function. It should be noted that this is a possible proposed preferred specific embodiment. In the event of a poor-quality batch condition as compared with a good-quality batch condition, the output stage of the voltage regulator circuit can only provide a comparatively low output current for the same actuation or voltage between the source terminal and gate terminal, i.e., for the same source-gate voltage of the output transistor. Using a further transistor and a resistor electrically connected thereto, this behavior is replicated in circuitry. In the event of a poor-quality batch condition, the source-gate voltage of the further transistor is higher and thus reduces the voltage drop across the resistor and therefore the current IC which flows between the output of the voltage regulator circuit and ground through the resistor and the further transistor. This current is combined with a load-current-dependent current on the basis of the proposed circuit.

According to an example embodiment of the present invention, the current source of the second coupling circuit is preferably a bandgap voltage reference circuit, which is configured to generate a current that is proportional to the temperature. A current flowing between the output VOUT and ground through a transistor and a resistor connected in series with the transistor is adjusted by way of a current IPTAT, which is proportional to the temperature and can be provided via the terminal IPTAT as a current flowing in the direction of ground. This current IPTAT is combined with the currents IC and IL by said current mirrors, for example.

According to an example embodiment of the present invention, the voltage regulator circuit preferably comprises an RC low-pass filter, which is electrically conductively connected in series with the control terminal of the transistor of the first coupling circuit. This can produce a bandwidth limitation. The RC low-pass filter can have a positive influence on the stability of the control loop.

The method according to the present invention for providing a regulated voltage comprises the following steps in principle:

providing a regulator core, which comprises an operational amplifier having
    an output,
    a first input, and
    a second and third input, the second and third input being configured to have the opposite polarity to the first input, and
  providing an output stage comprising a transistor, wherein the output is electrically conductively connected to the control terminal of the transistor, wherein the first input is electrically conductively connected to a second terminal of the switching path of the transistor, and wherein the third input can be electrically conductively connected to a reference voltage source,
  establishing an electrically conductive connection of the second input to an input voltage source,
  establishing an electrically conductive connection of the second input to the output of a module,
  impressing a control current into the second input by way of the module, the level and/or polarization of which is dependent on a predetermined parameter and/or a measured variable.

Advantageous embodiments and developments of the present invention are disclosed herein.

BRIEF DESCRIPTION OF THE DRAWINGS

Exemplary embodiments of the present invention are explained in greater detail with reference to the figures and the following description, with FIGS. 1 and 2 already having been described in greater detail at the outset.

DETAILED DESCRIPTION OF EXAMPLE EMBODIMENTS

Figure 3:
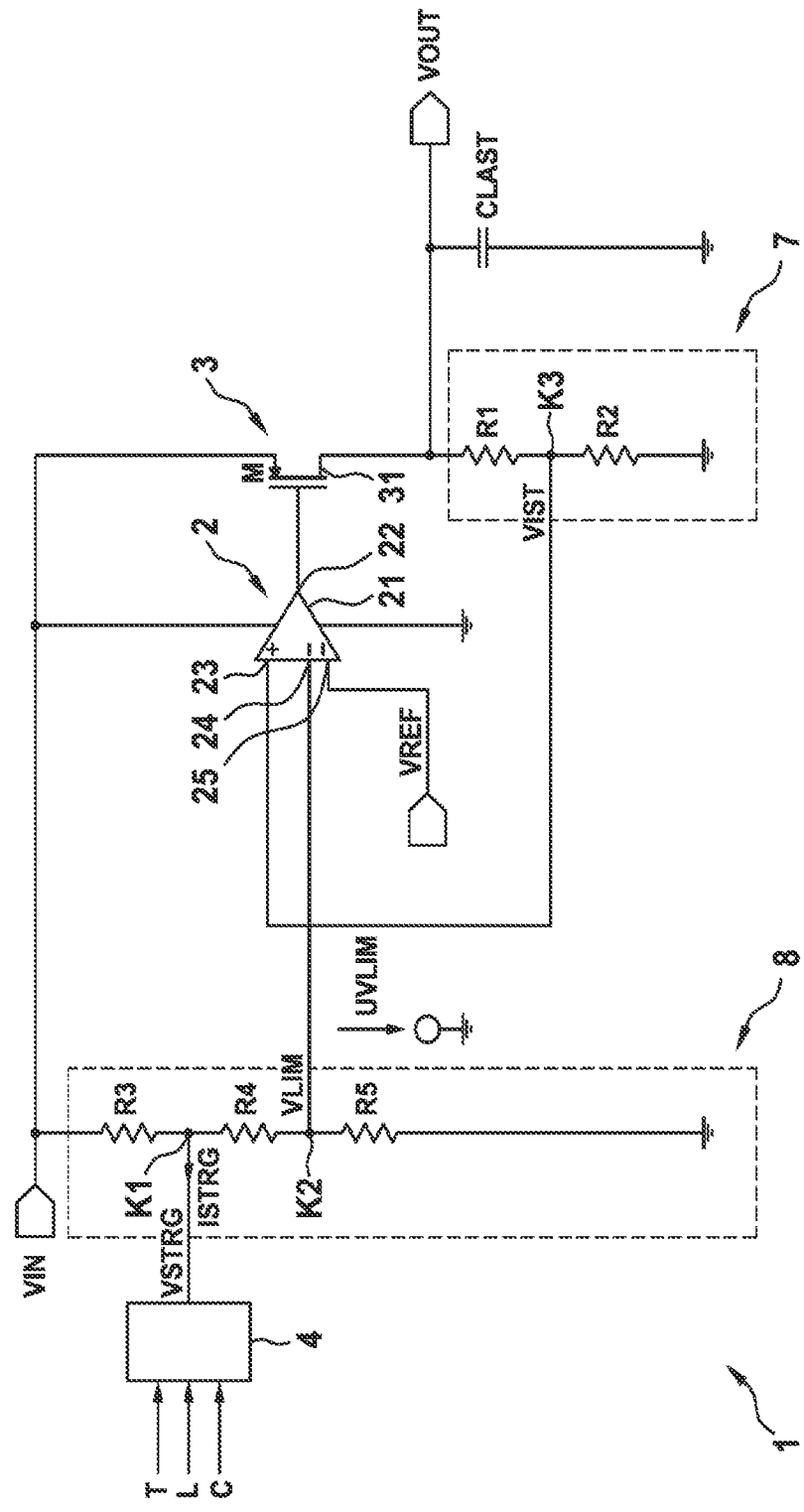
FIG. 3 is a schematic view of a voltage regulator circuit for providing a regulated voltage having temperature-dependent, load-dependent, and batch-dependent drop regulation according to a specific embodiment of the present invention.

FIG. 3 shows a voltage regulator circuit 1 for providing a regulated voltage having temperature-dependent, load-dependent, and batch-dependent drop regulation according to a specific embodiment of the present invention. The non-inverting input INP 23 (also referred to as the first input, but for the purpose of simpler technical phraseology, reference is just made to a non-inverting input in the following) of the regulator core 2 is electrically conductively connected to the output (network VIST) of the first voltage divider 7 composed of R1 and R2, which controls the divided output voltage UVOUT at its output (network VIST). A first inverting input INN1 24 (also referred to as the second input, but for the purpose of simpler technical phraseology, reference is just made to an inverting input in the following) of the regulator core 2 is electrically conductively connected to the output (network VLIM) of the second voltage divider 8 composed of the resistors R3, R4, and R5, which controls the divided input voltage UVIN at a node K2 (network VLIM) between R4 and R5, and a second inverting input INN2 25 (also referred to as the third input, but for the purpose of simpler technical phraseology, reference is just made to an inverting input in the following) is electrically conductively connected to a reference voltage UVREF, which is provided via the input VREF. When the second voltage divider composed of R3, R4, and R5 is suitably dimensioned, the voltage UINN1 at the first inverting input INN1 24 of the regulator core 2 is lower than the reference voltage UVREF at the second inverting input INN2 25 of the regulator core 2 when the difference between the input voltage UVIN and the nominal target value of the output voltage UVOUT_nom reaches or falls below a critical value beyond which the voltage regulator circuit could no longer reach or maintain the nominal target value of the output voltage UVOUT_nom.

Figure 1:
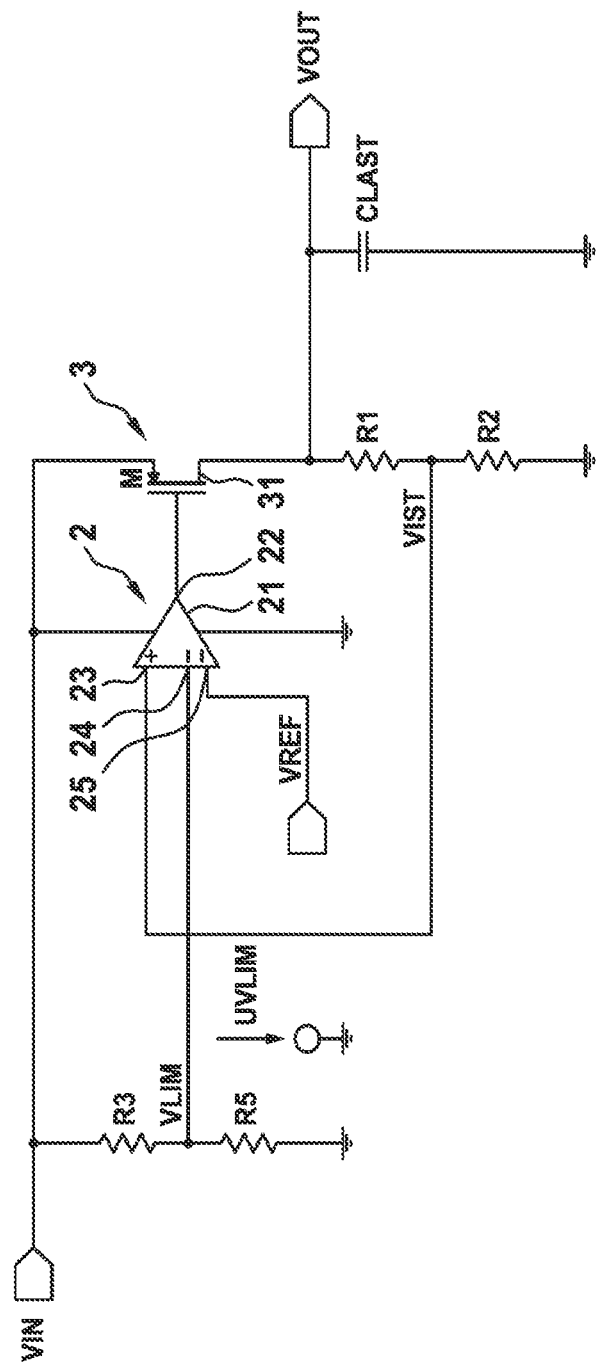
FIG. 1 shows a voltage regulator having drop regulation according to the related art.
Figure 2:
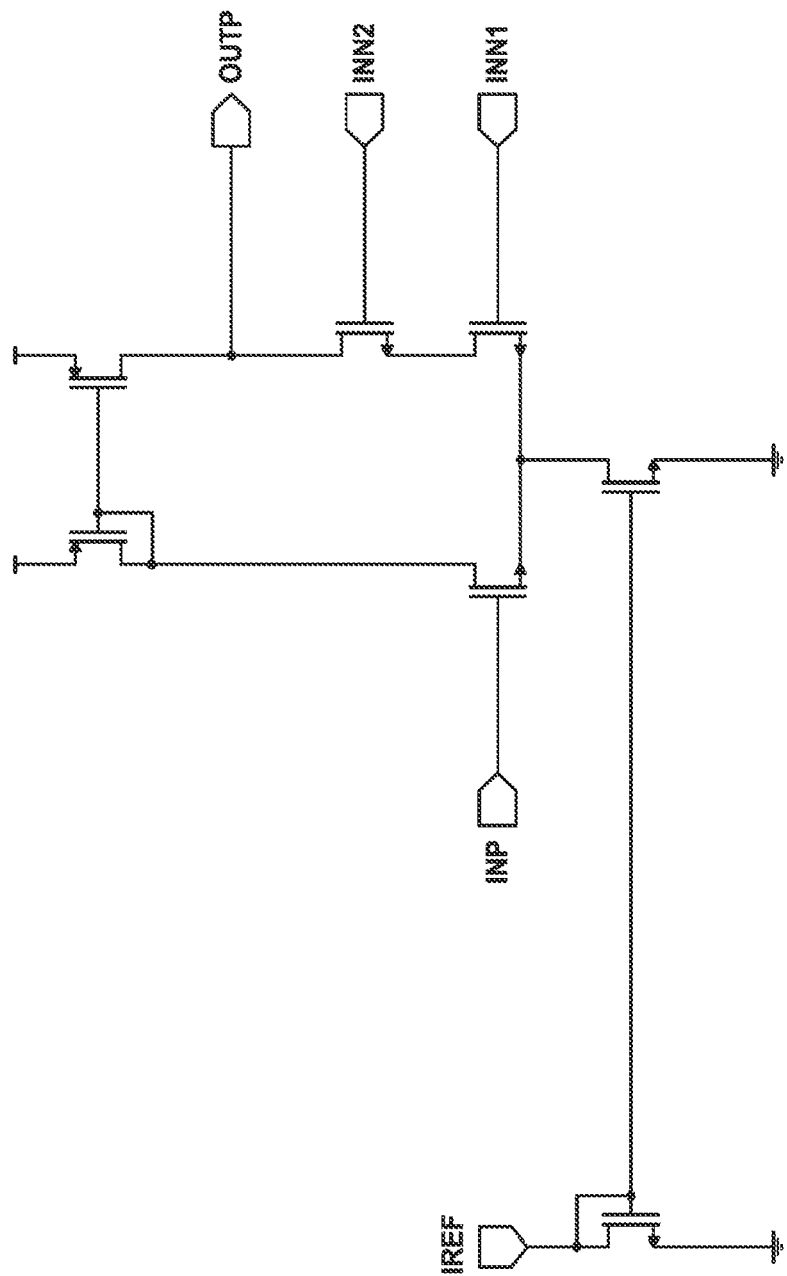
FIG. 2 shows a circuit for implementing the regulator core shown in FIG. 1 comprising one non-inverting input and two inverting inputs on the operational amplifier.

By contrast with the voltage divider composed of R3 and R5 in FIG. 1 (conventional approach), the second voltage divider 8 according to the present invention in FIG. 3, which replaces said conventional voltage divider, can consist of the resistors R3, R4, and R5, such that there is a further tap at node K1 between R3 and R4 (network VSTRG). In this case, this further tap can be formed between R3 and R4, as shown in FIG. 3. However, the present invention is not limited to this arrangement. The tap for the network VLIM at node K2 can alternatively be arranged at node K1, and therefore the tap for the network VSTRG could be arranged at node K2. In a further specific embodiment, the further tap can also take place at a joint node together with the tap for the network VLIM between R3 and R5 by omitting the resistor R4 (the networks VLIM and VSTRG would then be combined to form a network VLIM VSTRG).

By impressing a control current ISTRG into the tap at node K1 of the second voltage divider 8 composed of R3-R5, on the basis of the level and/or polarization of the control current ISTRG, the voltage UVLIM can assume a higher or lower value than would be the case if ISTRG were not present. By adjusting the control current ISTRG, the voltage UVLIM can thus be varied while the input voltage UVIN remains unchanged. The level and polarization, or in other words the flow direction, of the control current ISTRG defines the extent to which the voltage UVLIM is above or below the value that would result in accordance with equation (3). Accordingly, as a result of the level and polarization of the control current ISTRG, the output voltage VOUT red can also be above or below the value that would result in accordance with equation (4).

Accordingly, this makes it possible, by way of a suitable provided current ISTRG, to reduce the output voltage to a reduced value in a temperature-dependent, load-dependent, and batch-dependent manner and of course, conversely, to increase the output voltage to an increased value. In this way, if the difference between the input voltage and the target value of the output voltage of the voltage regulator circuit 1 is too small, the output voltage is lowered on the basis of the current temperature, the load current that is currently to be provided, and the batch condition only to the extent that the output stage 3 is still capable of reaching or maintaining the new reduced target value of the output voltage without the voltage regulator circuit 1 undergoing a drop.

The control current ISTRG is determined and provided by the module 4 on the basis of an analog function. This function is given predetermined parameters as input variables. According to the embodiment shown in FIG. 3, the control current to be provided is determined on the basis of the current temperature, the current load current, and the batch condition.

Figure 4:
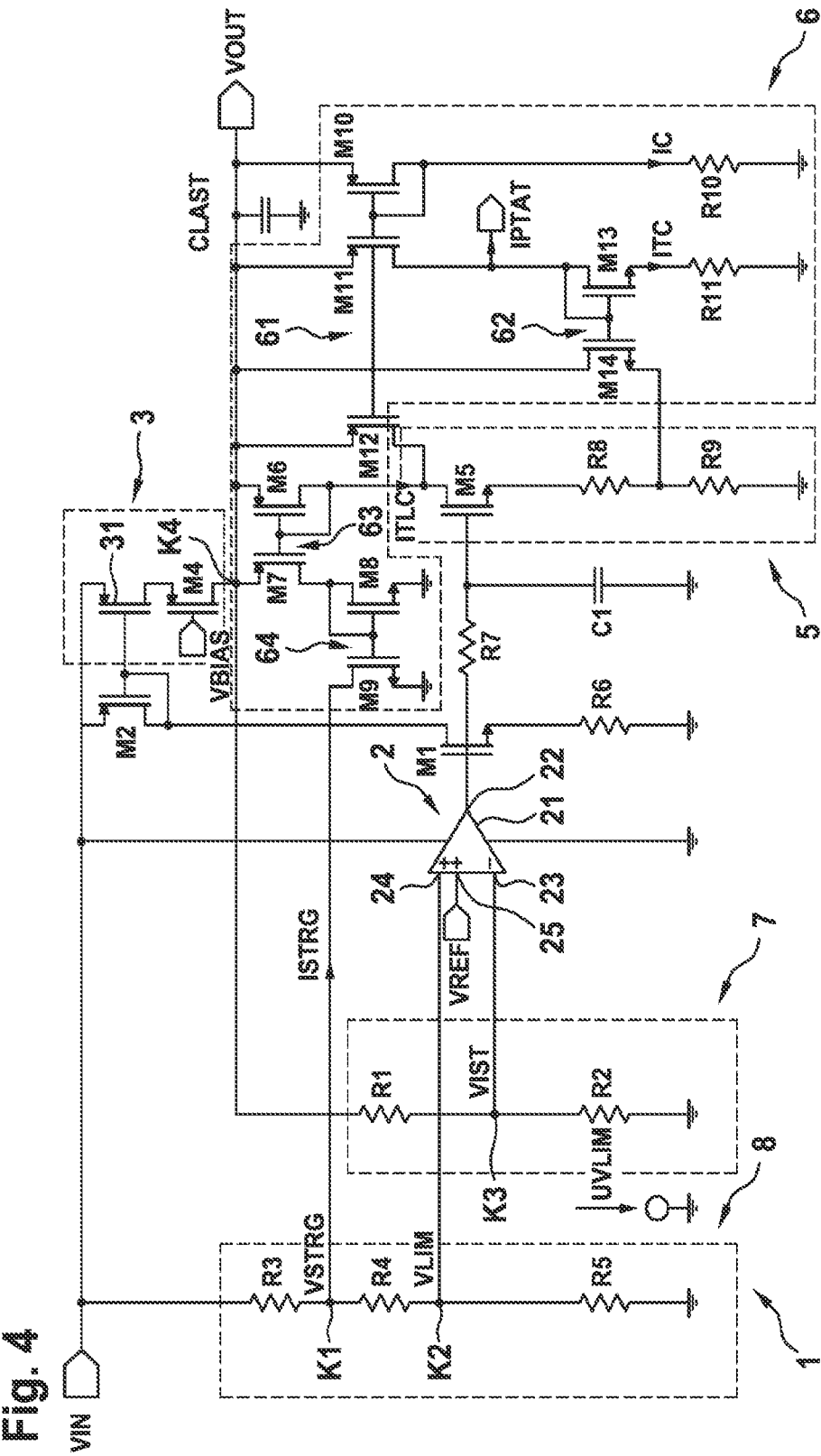
FIG. 4 shows a circuitry implementation of a voltage regulator circuit according to an example embodiment of the present invention.

FIG. 4 shows a circuitry implementation of a voltage regulator circuit 1 according to the present invention. In particular, the structure of the circuit of the module 4 is shown in conjunction with the voltage regulator circuit 1, which comprises the regulator core 2 and the transistor output stage.

MOS transistors are used in this case. However, the present invention is not limited to this type of transistor. Rather, other transistors, for example bipolar transistors, can also be used instead of the MOS transistors.

The inverting input INN 23 (also referred to as the first input, but for the purpose of simpler technical phraseology, reference is just made to an inverting input in the following) of the regulator core 2 is electrically conductively connected at node K3 to the output (network VIST) of the first voltage divider 7 composed of R1 and R2, which controls the divided output voltage UVOUT at its output (network VIST). A first non-inverting input INP1 24 (also referred to as the second input, but for the purpose of simpler technical phraseology, reference is just made to a non-inverting input in the following) of the regulator core 2 is electrically conductively connected at node K2 to the output (network VLIM) of the second voltage divider 8 composed of R3, R4, and R5, which controls the divided input voltage UVIN at its output (network VLIM). A second non-inverting input INP2 25 (also referred to as the third input, but for the purpose of simpler technical phraseology, reference is just made to a non-inverting input in the following) is connected to a reference voltage UVREF, which is provided at the input UVREF.

If the input voltage UVIN drops below a critical value, as described above, the voltage UVLIM also drops. Beyond a certain point, it is lower than the reference voltage UVREF. In this case, the voltage at the first non-inverting input INP1 24 is lower than the voltage at the second positive input INP2 25. Therefore, the first non-inverting input INP1 24 dominates the second non-inverting input INP2 25. As a result, the output voltage UVLIM of the second voltage divider 8 composed of R3, R4, and R5 is then used as the reference variable for the regulator core 2 instead of the reference voltage UVREF and is used to form the differential voltage.

Figure 5:
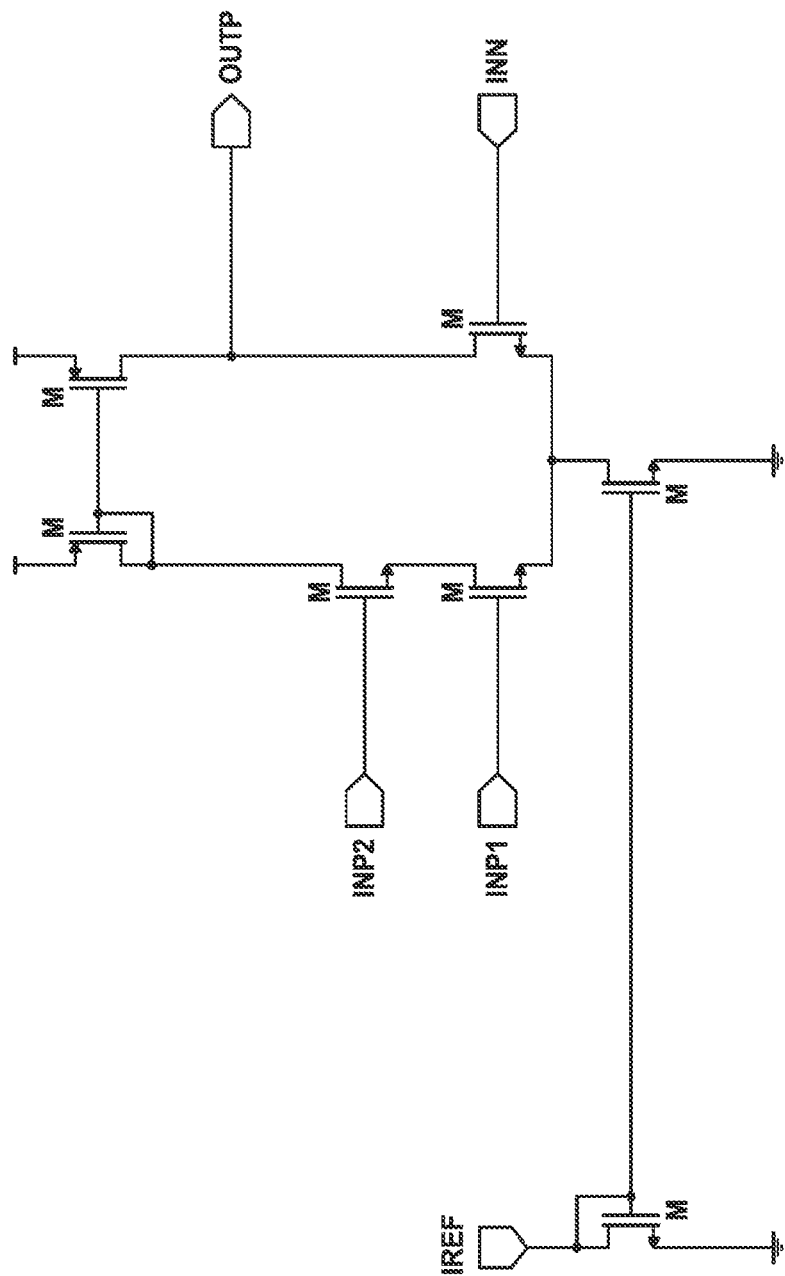
FIG. 5 shows a circuit for implementing the regulator core shown in FIG. 4 comprising two non-inverting inputs and one inverting input on the operational amplifier.

In the simplest case, the regulator core 2 consists of a differential amplifier or operational amplifier 21. By way of example, FIG. 5 shows a differential amplifier 21 comprising an inverting input INN, a first non-inverting input INP1, and a second non-inverting input INP2, as well as an output OUTP.

The output of the regulator core 2 is electrically conductively connected in series with the gate terminal of an NMOS transistor M1, the source terminal of which is connected to ground via a resistor R6. If the divided value VISI of the output voltage UVOUT of the voltage regulator circuit 1 is lower than UVLIM or UVREF at node K3, i.e., at the output (network VISI) of the first voltage divider 7 composed of R1 and R2, the voltage at the output 22 of the regulator core 2 increases and pulls the gate of the NMOS transistor M1 upward across the control terminal of the transistor M1, such that its drain current increases. The source-gate voltage at M2 and 31 likewise increases. Which of the two values UVLIM and UVREF is used to establish the difference is dependent on which of the two values is lower, i.e., dominates. The drain current is fed to the output VOUT of the voltage regulator circuit via the node K4 from the PMOS current mirror composed of M2 and 31 (amplified by the factor m) and via the cascode transistor M4, the gate of which is connected to a constant bias voltage, which is provided via the input VBIAS. The factor m is calculated in accordance with m=K3/K2 from the ratio K2=W2/L2 of width W2 to length L2 of the transistor M2 and the ratio K3=W3/L3 of width W3 to length L3 of the transistor 31. The mirror transistor 31 is the P-channel output stage of the voltage regulator circuit. CLAST is the load capacity of the voltage regulator circuit 1.

The circuit components described in the following are used to determine and provide the control current. In other words, they constitute the circuitry implementation of the module 4 and its analog function. In FIG. 4, a control current based on the current temperature, the current load current, and the batch condition is impressed. It should be noted that this is a possible proposed preferred specific embodiment. Furthermore, all three parameters do not have to be used to determine the control current. They can also be used in any combination.

The output of the regulator core 2 is also electrically conductively connected to the gate terminal of an NMOS transistor M5 in parallel with M1 via an optional RC low-pass filter composed of R7 and Cl, the source terminal of which transistor is electrically conductively connected to ground via a resistance divider composed of R8 and R9. If the load current of the voltage regulator circuit 1 changes, the regulator core 2 has to adjust the voltage at the gate of the transistor M1, as a result of which the same adjusted voltage is also present at the gate of the transistor M5. The drain current of the transistor M5 is therefore proportional to the load current of the voltage regulator 1 and thus contains the information on the load current. By way of the third PMOS current mirror 63 composed of M6 and M7 and the fourth NMOS current mirror 64 composed of M8 and M9, the load current of the voltage regulator circuit 1 therefore influences the voltage UVLIM at the output (network VLIM) of the second voltage divider 8 composed of R3-R5. When the resistance divider composed of R8 and R9, the current mirrors 63 and 64 composed of M6 and M7, and M8 and M9, respectively, and the second voltage divider 8 composed of R3-R5 are suitably dimensioned, the voltage UVLIM can be influenced on the basis of the load current of the voltage regulator circuit 1 such that, if the difference between the input voltage and the target value of the output voltage of the voltage regulator circuit 1 is too small, the output voltage is lowered according to the load current that is currently to be provided only to the extent that the P-channel output stage 3 is still capable of reaching or maintaining this new lowered or reduced target value of the output voltage without the voltage regulator circuit 1 undergoing a drop in the process.

In the event of a poor-quality batch condition as compared with a good-quality batch condition, the P-channel output stage 3 of the voltage regulator circuit 1 can only provide a comparatively low output current for the same actuation or voltage between the source terminal and gate terminal, i.e., for the same source-gate voltage of the output transistor 31. Using the transistor M10 and the resistor R10, this behavior is replicated in circuitry. In the event of a poor-quality batch condition, the source-gate voltage of M10 is higher and thus reduces the voltage drop across R10 and therefore the current IC which flows between the output VOUT and ground through the resistor R10, the transistor M10, and therefore also in the mirror transistors M11 and M12 of the first PMOS current mirror 61 composed of M10-M12 in a weighted manner in accordance with the width-length ratios K10=W10/L10, K11=W11/L11, and K12=W12/L12.

A current IPTAT that is proportional to the temperature and can be provided via the terminal IPTAT as a current flowing in the direction of ground is subtracted from the current of the mirror transistor M11.

As a result, a current ITC which is both linearly influenced by the temperature and is dependent on the batch flows through the transistor M13. The current ITC thus contains information on both the batch condition and the temperature. The current ITC generates a voltage drop across the resistor R11 and also determines the source-gate voltage of the transistor M13 and thus also the voltage at the gate of the transistor M14, the source terminal of which is connected to the center tap of the voltage divider composed of R8 and R9. In this way, the current ITLC flowing through the transistor M5 additionally is given a batch-dependent and a temperature-dependent component in addition to the load-current-dependent component (see above). The resulting current ITLC that is drawn from the tap VSTRG of the second voltage divider 8 composed of R3-R5 by the transistor M5 via the third PMOS current mirror 63 composed of M6 and M7 and the fourth NMOS current mirror 64 composed of M8 and M9 thus influences the voltage UVLIM at the output (network VLIM) of the second voltage divider 8 composed of R3-R5. When the resistors R8-R11 and the transistors M5-M14 are suitably dimensioned, the voltage UVLIM can be influenced on the basis of the temperature, the load current of the voltage regulator, and the batch condition such that, if the difference between the input voltage and output voltage of the voltage regulator is too small, the output voltage is lowered according to the current temperature, the load current that is currently to be provided, and the batch condition only to the extent that the P-channel output stage 3 is still capable of reaching or maintaining this lowered or reduced output voltage without the voltage regulator undergoing a drop in the process.

Figure 6:
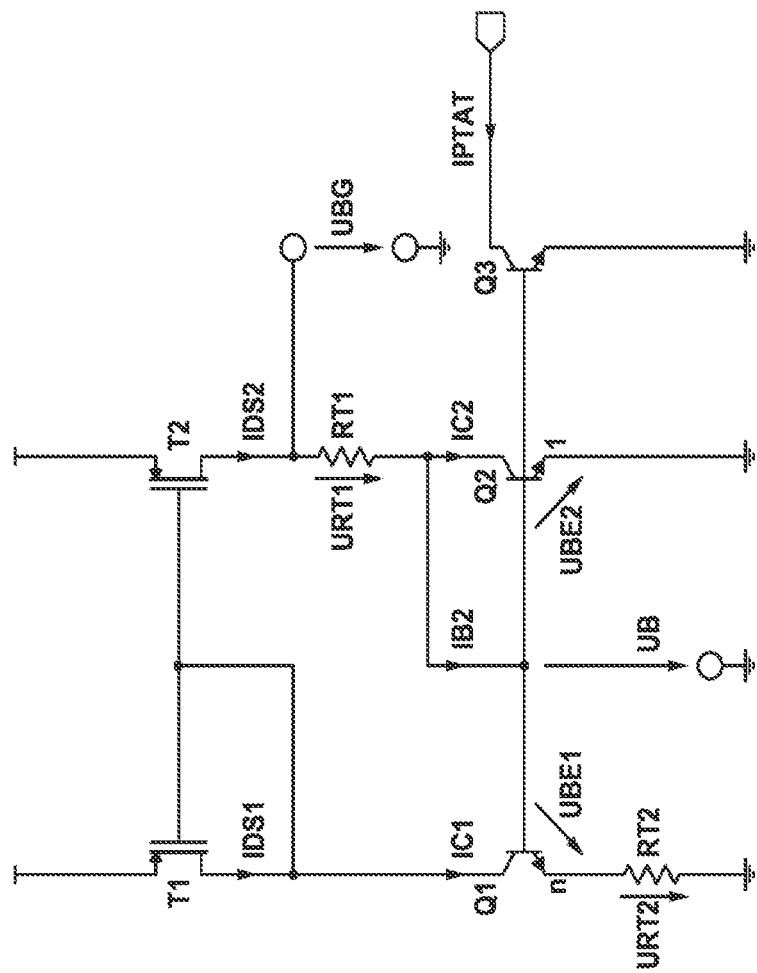
FIG. 6 shows a bandgap voltage reference circuit as a temperature-dependent current generator.

To generate the current IPTAT that is proportional to the temperature, a bandgap voltage reference circuit in accordance with FIG. 6, as described in the literature, can be used. The two bipolar transistors Q1 and Q2 in FIG. 6 have different current-voltage characteristic curves IC1(UB) and IC2(UB) owing to their different sizes (Q1 is larger than Q2 by the factor n) and the negative current feedback of Q1 (caused by the resistor RT1). Owing to the current mirror composed of T1 and T2, for both bipolar transistors the working point is the point at which both their base voltage UB and their collector currents IC1 and IC2 are identical. Here, the base-emitter voltage UBE2 of Q2 is lower than the base-emitter voltage UBE1 of Q1 by $\Delta UBE=kT/q \times \ln(n)$ (k is the Boltzmann constant, T is the absolute temperature, q is the charge of an electron, and n is the size ratio of Q1/Q2). The voltage difference $\Delta UBE$, together with the selection of the resistor RT1, determines the collector current IC1 of Q1 or IC2 of Q2 and the drain-source currents IDS1 of T1 and IDS2 of T2, where $IC1=IC2=IDS1=IDS2=IPTAT=1/R1 \times kT/q \times \ln(n)$. The current IPTAT is highly temperature-dependent. It is proportional to absolute temperature. Within the temperature range that is standard in the automotive sector, at 150° C. this current is greater than the current at −40° C. approximately by a factor of 2.

Although the present invention has been illustrated and described in more detail using preferred exemplary embodiments, the present invention is not limited to the disclosed examples and a person skilled in the art may derive other variations therefrom without departing from the scope of the present invention.

What is claimed is:

1. A voltage regulator circuit for providing a regulated voltage, comprising:
a regulator core which includes an operational amplifier having an output, a first input, and a second and third input, the second and third input being configured to have an opposite polarity to the first input; and
an output stage including a transistor, wherein the output is electrically conductively connected to the control terminal of the transistor, the first input is electrically conductively connected to a second terminal of a switching path of the transistor, and the third input can be electrically conductively connected to a reference voltage source;
wherein the second input can be electrically conductively connected to an input voltage source and the second input is electrically conductively connected to an output of a module which is configured to impress a control current into the second input, a level and/or polarization of which is dependent on predetermined parameters,
wherein the module includes circuitry configured to generate a control current that is both linearly influenced by a temperature in a vicinity of the voltage regulator circuit and dependent on a batch condition of the output stage, the control current being operable to adjust the output voltage to a reduced value that corresponds to a voltage level maintainable by the output stage.

2. The voltage regulator circuit as recited in claim 1, wherein the output stage is a P-channel output stage.

3. The voltage regulator circuit as recited in claim 1, wherein a first parameter of the predetermined parameters is determined by a load current provided by the output stage.

4. The voltage regulator circuit as recited in claim 3, wherein a second parameter of the predetermined parameters is determined by a batch condition of the output stage.

5. The voltage regulator circuit as recited in claim 4, wherein a third parameter of the predetermined parameters is determined by a temperature prevailing in an immediate vicinity of the voltage regulator circuit.

6. The voltage regulator circuit as recited in claim 3, wherein the module includes a first coupling circuit, which has a transistor and a resistor, wherein a control terminal of the transistor of the first coupling circuit is electrically conductively connected to the output, and the switching path of the transistor of the first coupling path is electrically conductively connected to the second input at a second terminal and is electrically conductively connected to ground by a first terminal via the resistor arranged in series.

7. The voltage regulator circuit as recited in claim 6, wherein the module includes a second coupling circuit, which has a first, second, third, and fourth current mirror, a transistor, and a first, second, and third resistor, wherein:
a control terminal of the transistor of the second coupling circuit is electrically conductively connected to control terminals of the first current mirror,
a switching path of the transistor of the second coupling path is electrically conductively connected to the second input at a first terminal and is electrically conductively connected to ground by a second terminal via the first resistor arranged in series,
a switching path of a first mirror transistor of the first current mirror is electrically conductively connected to the second input at a first terminal and is electrically conductively connected in series with a second terminal of a first mirror transistor of the second current mirror by a second terminal,
a switching path of a first mirror transistor of the second current mirror is electrically conductively connected to ground at a first terminal via the second resistor arranged in series and a switching path of a second mirror transistor of the second current mirror is electrically conductively connected by a first terminal to the switching path of the transistor of the first coupling circuit between the transistor of the first coupling circuit and the resistor of the first coupling circuit, wherein the third resistor is arranged between the connection and the transistor of the first coupling circuit,
a switching path of a second mirror transistor of the first current mirror and a switching path of a second mirror transistor of the second current mirror are electrically conductively connected to the second input at a first terminal and a second terminal,
the switching path of the second mirror transistor of the first current mirror is electrically conductively connected to the switching path, opposite ground, of the transistor of the first coupling circuit by a second terminal,
a switching path of a first and second mirror transistor of the third current mirror is electrically conductively connected to the first input at a first terminal and the switching path of the first mirror transistor of the third current mirror is electrically conductively connected to the switching path, opposite ground, of the transistor of the first coupling circuit by a second terminal, a constant current source is electrically conductively connected to a switching path between the first mirror transistor of the first current mirror and the first mirror transistor of the second current mirror, a switching path of a first mirror transistor of the fourth current mirror is electrically conductively connected to the second mirror transistor of the third current mirror at a second terminal and is electrically conductively connected to ground by a first terminal, and a switching path of a second mirror transistor of the fourth current mirror is electrically conductively connected to the second input at a second terminal and is electrically conductively connected to ground by a first terminal.

8. The voltage regulator circuit as recited in claim 7, wherein a current source of the second coupling circuit includes a bandgap voltage reference circuit, which is configured to generate a current that is proportional to a temperature.

9. The voltage regulator circuit as recited in claim 6, wherein the control terminal of the transistor of the first coupling circuit is electrically conductively connected in series with an RC low-pass filter.

10. A method for providing a regulated voltage, comprising:

providing a regulator core including an operational amplifier having an output, a first input, and a second and a third input, the second and third input being configured to have the opposite polarity to the first input;

providing an output stage including a transistor, wherein the output is electrically conductively connected to a control terminal of the transistor, the first input is electrically conductively connected to a second terminal of a switching path of the transistor, and the third input can be electrically conductively connected to a reference voltage source;

establishing an electrically conductive connection of the second input to an input voltage source;

establishing an electrically conductive connection of the second input to an output of a module;

impressing a control current into the second input by way of the module, a level and/or polarization of which is dependent on a predetermined parameter and/or a measured variable; and adjusting an output voltage of the output stage based on the control current to a reduced value within an operating range of the output stage, wherein the control current is generated based at least in part on a temperature in a vicinity of a voltage regulator circuit and a batch condition of the output stage.

* * * * *